United States Patent
Chen

(10) Patent No.: US 11,041,726 B2
(45) Date of Patent: Jun. 22, 2021

(54) INERTIAL MEASUREMENT APPARATUS AND MECHANICAL DEVICE

(71) Applicant: AUTEL ROBOTICS CO., LTD., Guangdong (CN)

(72) Inventor: Faquan Chen, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 200 days.

(21) Appl. No.: 16/132,824

(22) Filed: Sep. 17, 2018

(65) Prior Publication Data

US 2019/0056228 A1 Feb. 21, 2019

Related U.S. Application Data

(63) Continuation of application No. PCT/CN2018/079617, filed on Mar. 20, 2018.

(30) Foreign Application Priority Data

Aug. 17, 2017 (CN) .......................... 201710708522.0

(51) Int. Cl.
| | |
|---|---|
| *G01C 21/18* | (2006.01) |
| *G01P 15/14* | (2013.01) |
| *G01P 15/02* | (2013.01) |
| *G01C 19/5733* | (2012.01) |
| *G01C 19/5783* | (2012.01) |

(52) U.S. Cl.
CPC .......... *G01C 21/18* (2013.01); *G01C 19/5733* (2013.01); *G01C 19/5783* (2013.01); *G01P 15/02* (2013.01); *G01P 15/14* (2013.01)

(58) Field of Classification Search
CPC ................ G01C 21/18; G01C 19/5733; G01C 19/5783; G01P 15/02; G01P 15/14
See application file for complete search history.

(56) References Cited

U.S. PATENT DOCUMENTS

| | | | |
|---|---|---|---|
| 9,790,089 B2 * | 10/2017 | Dawson | ................ B81B 7/0061 |
| 2007/0032951 A1 * | 2/2007 | Tanenhaus | ............. G01C 25/00 |
| | | | 702/151 |
| 2008/0181592 A1 | 7/2008 | Mogamiya | |
| 2009/0315127 A1 * | 12/2009 | Kulach | ................ B81B 7/0054 |
| | | | 257/415 |

(Continued)

FOREIGN PATENT DOCUMENTS

| | | |
|---|---|---|
| CN | 201598171 U | 10/2010 |
| CN | 102449433 A | 5/2012 |
| CN | 102798733 A | 11/2012 |

(Continued)

OTHER PUBLICATIONS

International Search Report dated Jun. 27, 2018; PCT/CN2018/079617.

(Continued)

*Primary Examiner* — Ryan D Walsh

(57) ABSTRACT

The present invention relates to an inertial measurement apparatus and a mechanical device. The inertial measurement apparatus includes a PCB board and an inertial measurement unit (IMU). The PCB board includes a PCB body portion and an isolation portion that is formed by slotting a side of the PCB board and fixedly connected to the PCB body portion. The IMU is disposed on the isolation portion.

16 Claims, 6 Drawing Sheets

(56) References Cited

U.S. PATENT DOCUMENTS

2014/0055974 A1    2/2014  Hansen
2018/0027650 A1*  1/2018  Wyatt .................. G06F 3/0421
                                                              345/175

FOREIGN PATENT DOCUMENTS

| CN | 205256688 U | | 5/2016 |
|---|---|---|---|
| CN | 205664838 U | * | 10/2016 |
| CN | 205664838 U | | 10/2016 |
| CN | 107478224 A | | 12/2017 |
| CN | 207248193 U | | 4/2018 |
| DE | 102013211142 A1 | | 6/2013 |
| EP | 2135839 A2 | | 12/2009 |

OTHER PUBLICATIONS

M. Fujiyoshi, et al; "SOI 3-axis accelerometer with a stress reduction structure", IEEE Sensors 2014 proceedings, IEEE, Nov. 2, 2014; Abstract Only Submitted.
Supplementary European Search Report completed Jun. 6, 2019; EP18765793.

* cited by examiner

INERTIAL MEASUREMENT APPARATUS AND MECHANICAL DEVICE

CROSS-REFERENCE

This application is a continuation application of International Application PCT/CN2018/079617, filed on Mar. 20, 2018, which claims priority of Chinese Patent Application 201710708522.0, filed on Aug. 17, 2017, which is incorporated herein by reference in its entirety.

BACKGROUND

Technical Field

The present invention relates to inertial-measurement-related device improvement, and in particular, to an inertial measurement apparatus and a mechanical device.

Related Art

Unmanned aerial vehicle technologies are developing rapidly. At present, an inertial measurement unit (IMU) board of a Aerial photography stability augmentation gimbal in the unmanned aerial vehicle industry is usually fixed by locking screws. Specifically, an IMU of a gimbal mainly includes a gyroscope, an accelerometer and a microcontroller unit (MCU). The gyroscope detects the angular velocity, the accelerometer detects the acceleration. Information about the angular velocity and the acceleration is fed back to the MCU through a serial interface, and the MCU performs further algorithm processing to control a three-axis motor of the gimbal to perform corresponding motion compensation, thereby achieving stability augmentation control of the gimbal. The IMU board is fixed on a lens module and rigidly connected to a pitch axis. The IMU board can detect angular velocities and accelerations of the lens module in three directions in real time, and then control the three-axis motor based on a gimbal algorithm to implement motion compensation, thereby achieving stability augmentation of the gimbal.

However, in such a method, the IMU board is subject to mechanical stress generated by screws or other fixing structures. The gyroscope and the accelerometer generate noise and zero offset (output of the gyroscope when an input angular velocity is zero is referred to as zero offset) due to the mechanical stress, or other performance parameters are deteriorated or even damaged. Such problems will reduce output precision of the gyroscope and the accelerometer, which reduces control precision of the gimbal and degrades stability augmentation of the gimbal.

In traditional IMU board design, a printed circuit board (PCB) is generally designed based only on layout guidance of a gyroscope or accelerometer integrated circuit (IC). For example, pins are symmetrically wired, a device does not have other elements placed around at a specific distance, or the device center is not perforated or wired. Although these design solutions design the PCB from the perspective of stress, only stress balance of an MEMS chip is considered, rather than stress of the entire PCB, which cannot withstand large external unbalanced mechanical stress from, for example, screw locking and hard fitting, deteriorating noise, zero offset and other performance of the gyroscope and the accelerometer.

SUMMARY

In view of this, for how to improve a traditional inertial measurement structure to resolve problems such as large noise and zero offset caused by large mechanical stress, it is necessary to provide an inertial measurement apparatus and a mechanical device adopting the inertial measurement apparatus.

An inertial measurement apparatus includes a PCB board and an IMU, the PCB board including a PCB body portion and an isolation portion that is formed by slotting a side of the PCB board and fixedly connected to the PCB body portion, and the IMU being disposed on the isolation portion.

In an embodiment, the PCB body portion is integrally connected to the isolation portion.

In an embodiment, the isolation portion is provided with a connection seat, the IMU being fixedly connected to the connection seat.

In an embodiment, the PCB body portion is symmetrically provided with a pair of installation seats on two sides of the connection seat.

In an embodiment, the slotting is forming a spacing slot, which is formed between each installation seat and the connection seat on the PCB board.

In an embodiment, the spacing slot includes a continuous spacing slot and/or a discontinuous spacing slot.

In an embodiment, the continuous spacing slot is L-shaped or rectangular.

In an embodiment, the two spacing slots are symmetrically formed.

In an embodiment, the spacing slot is a slot area formed by removing copper foil on the PCB board or a slot area formed by cutting a part of the PCB board.

In an embodiment, the PCB body portion is provided with an isolation area around each installation seat.

In an embodiment, the isolation area is ring-shaped.

In an embodiment, the isolation area is a remaining position after conductive copper foil of the PCB board is removed.

In an embodiment, the IMU includes a gyroscope and/or an accelerometer.

In an embodiment, there is a plurality of IMUs, the PCB board being correspondingly provided with a plurality of connection seats, and the spacing slot being formed between any two adjacent connection seats.

A mechanical device includes the inertial measurement apparatus according to any of the embodiments.

In an embodiment, the mechanical device is a gimbal, a robot, an unmanned aerial vehicle or a manned aircraft.

In the inertial measurement apparatus and the mechanical device, PCB board design of the inertial measurement apparatus is optimized with a side of the PCB board slotted, so that the IMU is separated from the PCB body portion generating a mechanical stress source, mechanical stress transferred to the inertial measurement apparatus is reduced or even eliminated, and the IMU such as a gyroscope and an accelerometer in the inertial measurement apparatus is less affected by the mechanical stress, which reduces noise and zero offset, helps achieve optimal performance of the gyroscope and the accelerometer, and improves control precision of the inertial measurement apparatus, being particularly applicable to devices or fields such as gimbals, robots, unmanned aerial vehicles or manned aircrafts.

DETAILED DESCRIPTION

Figure 1:
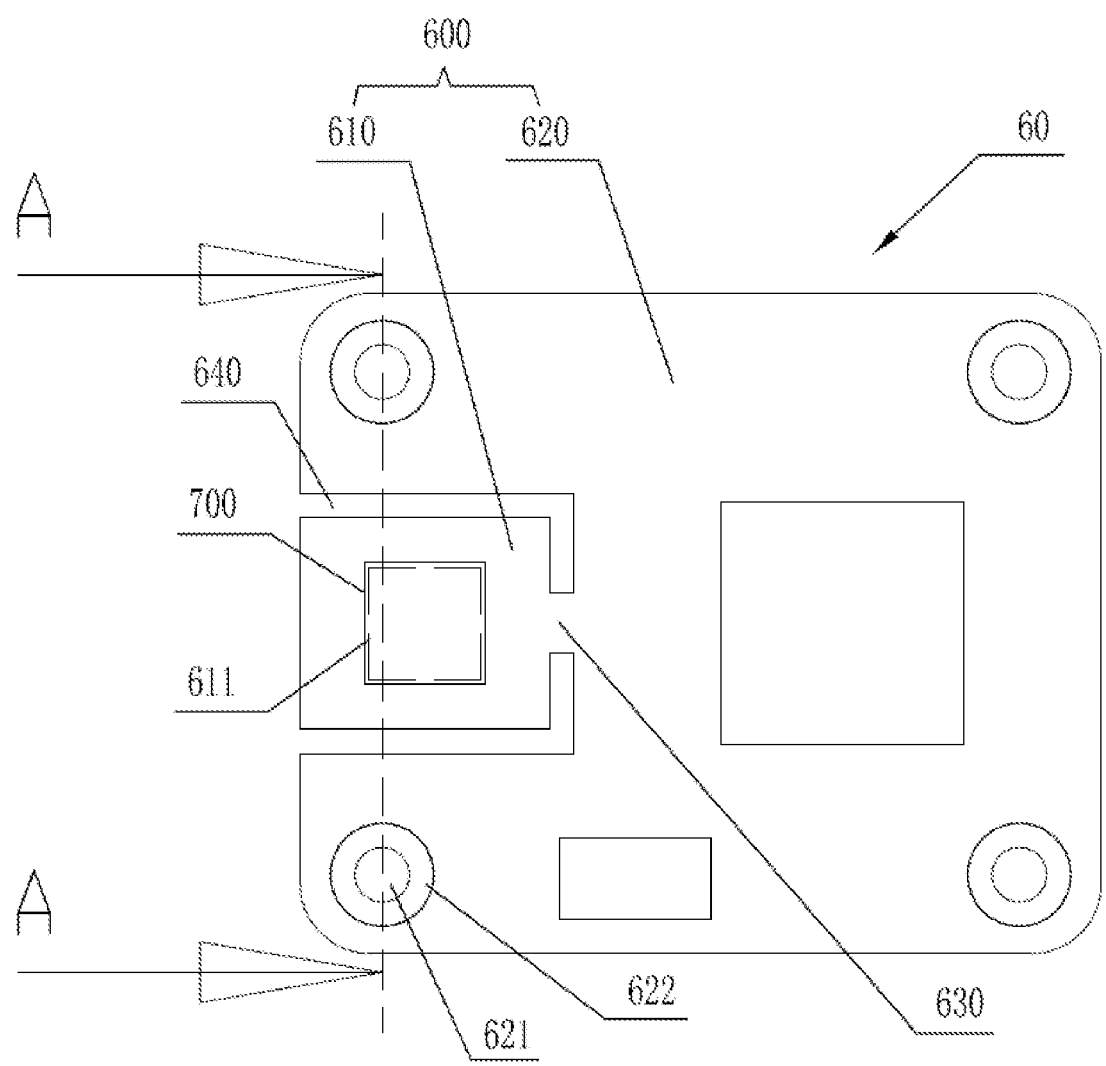
FIG. 1 is a schematic structural diagram of an inertial measurement apparatus according to an embodiment of the present invention.

To make the foregoing objectives, features and advantages of the present invention more comprehensible, specific implementations of the present invention are described below in detail with reference to the accompanying drawings. In the following description, numerous specific details are set forth to fully understand the present invention. However, the present invention can be implemented in many other ways different from those described herein, and those skilled in the art can make similar improvements without departing from the content of the present invention. Therefore, the present invention is not limited to the specific embodiments disclosed below.

It should be noted that, when an element is "fixed on" or "disposed on" another element, the element may be placed on the another element directly or by using an intermediate element. When an element is considered as "connected to" another element, the element may be connected to the another element directly or by using an intermediate element. As used in this specification, the terms "vertical", "horizontal", "left", "right" and similar expressions are intended only for description, and not meant to be the only embodiment.

Unless otherwise defined, all technical and scientific terms used in this specification have the same meanings as commonly understood by those skilled in the art to which the present invention pertains. The terms used in this specification are intended only for describing specific implementations, and not intended to limit the present invention. As used in this specification, the term "and/or" includes any and all combinations of one or more associated listed items.

In an embodiment of the present invention, an inertial measurement apparatus includes a PCB board and an IMU, the PCB board including a PCB body portion and an isolation portion that is formed by slotting a side of the PCB board and fixedly connected to the PCB body portion, and the IMU being disposed on the isolation portion. In this way, a slot is formed between the IMU and the PCB body portion, so that mechanical stress that is transferred from the PCB body portion to the isolation portion and finally reaches the IMU can be reduced, and the IMU is less affected by the mechanical stress, which reduces noise and zero offset, helps achieve optimal performance of the IMU, and improves control precision of the inertial measurement apparatus. For example, the isolation portion that is formed by slotting a side of the PCB board and fixedly connected to the PCB body portion is implemented as follows: a slot body is formed on a side of the PCB board, a part of the isolation portion being fixedly connected to the PCB body portion and the other part of the isolation portion being separated from the PCB body portion by the formed slot body. In an example, the isolation portion is formed by symmetrically slotting a side of the PCB board and is fixedly connected to the PCB body portion. That is, an inertial measurement apparatus includes a PCB board and an IMU, the PCB board including a PCB body portion and an isolation portion that is formed by symmetrically slotting a side of the PCB board and fixedly connected to the PCB body portion, and the IMU being disposed on the isolation portion. For example, symmetric slot bodies are formed on a side of the PCB board, a part of the isolation portion being fixedly connected to the PCB body portion and the other part of the isolation portion being separated from the PCB body portion by the symmetric slot bodies. The slot body may also be referred to as a spacing slot.

For example, the PCB body portion is integrally connected to the isolation portion. That is, the PCB body portion and the isolation portion are located on a same PCB board, which is slotted to form the PCB body portion and the isolation portion that are partially connected and relatively separated. Alternatively, the PCB body portion and the isolation portion are separately disposed and are connected by a connecting piece. For example, the isolation portion of the inertial measurement apparatus is provided with a connection seat, the IMU being fixedly connected to the connection seat. In this way, a connection position of the IMU can be standardized, which facilitates overall design of the inertial measurement apparatus and separate production of the PCB board and the IMU in the inertial measurement apparatus. For example, the PCB body portion is symmetrically provided with a pair of installation seats on two sides of the connection seat. For example, the "symmetrically provided" means being symmetrically provided relative to a symmetry axis. For example, the connection seat is a symmetric structure and is symmetrically disposed relative to the symmetry axis. In this way, from the perspective of mechanics, the pair of symmetrically provided installation seats help balance stress on two sides of the connection seat, thereby reducing impact to the IMU due to unbalanced stress on two sides of the PCB body portion. For example, the slotting is forming a spacing slot, which is formed between each installation seat and the connection seat on the PCB board. In an example, the spacing slot is formed between each of the two installation seats and the connection seat, the two spacing slots being symmetrically formed. For example, the two spacing slots are also symmetrically formed relative to the symmetry axis. For example, the PCB board of the inertial measurement apparatus is provided with a connection seat, a pair of installation seats are symmetrically disposed on two sides of the connection seat of the PCB board, and a spacing slot is formed between each installation seat and the connection seat of the PCB board. For example, the connection seat is used to install and connect to the IMU and the installation seat is used to install the PCB board. In the inertial measurement apparatus, PCB board design of the inertial measurement apparatus is optimized, so that mechanical stress transferred to the inertial measurement apparatus is reduced or even eliminated, and the IMU such as a gyroscope and an accelerometer in the inertial measurement apparatus is less affected by the mechanical stress, which reduces noise and zero offset, helps achieve optimal performance of the gyroscope and the accelerometer, and improves control precision of the inertial measurement apparatus, being particularly applicable to devices or fields such as gimbals, robots, unmanned aerial vehicles or manned aircrafts. When a plurality of IMUs needs to be installed, a plurality of connection seats may be disposed. For example, there is one or more connection seats. When the PCB board is provided with a plurality of connection seats, the spacing slot is formed between any two adjacent connection seats. That is, the spacing slot is formed between any two adjacent connection seats. For example, the PCB board of the inertial measurement apparatus is provided with one or more connection seats, a pair of installation seats are symmetrically disposed on two sides of the connection seat of the PCB board, a spacing slot is formed between each installation seat and the connection seat of the PCB board, and when the PCB board is provided with a plurality of connection seats, the spacing slot is also formed between any two adjacent connection seats. For example, the PCB board of the inertial measurement apparatus is provided with one or more connection seats based on a quantity of IMUs needing to be installed. For another example, the PCB board of the inertial measurement apparatus is provided with a plurality of connection seats, a pair of installation seats are symmetrically disposed on two sides of the connection seat of the PCB board, a spacing slot is formed between each installation seat and the connection seat of the PCB board, and the spacing slot is also formed between any two adjacent connection seats. The shape of the spacing slot formed between each installation seat and the connection seat of the PCB board is the same as or different from the shape of the spacing slot formed between any two adjacent connection seats.

In an embodiment, the PCB board is provided with an isolation area around each installation seat. In this way, noise of the IMU can be reduced by about 60%. For example, the PCB board of the inertial measurement apparatus is provided with a connection seat, a pair of installation seats are symmetrically disposed on two sides of the connection seat of the PCB board, a spacing slot is formed between each installation seat and the connection seat of the PCB board, and the PCB board is provided with an isolation area around each installation seat. For another example, the PCB board of the inertial measurement apparatus is provided with a connection seat, a pair of installation seats are symmetrically disposed on two sides of the connection seat of the PCB board, the PCB board is provided with an isolation area around each installation seat, and a spacing slot is formed between each installation seat and the connection seat of the PCB board. In this way, the isolation area is formed. Because conductive copper foil in the isolation area is removed, rigidity is lowered and a part of mechanical stress of the installation seat can be absorbed. In an embodiment, the isolation area is ring-shaped. For example, the isolation area is in the shape of a circular ring, a square ring or a polygonal ring.

For example, the PCB board is provided with an isolation area around the periphery of each installation seat. In this way, because conductive copper foil in the isolation area is removed, rigidity is lowered and a part of mechanical stress of the installation seat can be absorbed, thereby reducing impact from the mechanical stress of the installation seat to the connection seat. In an embodiment, the isolation area is ring-shaped. For example, the isolation area is in the shape of a circular ring, a square ring or a polygonal ring.

Figure 2:
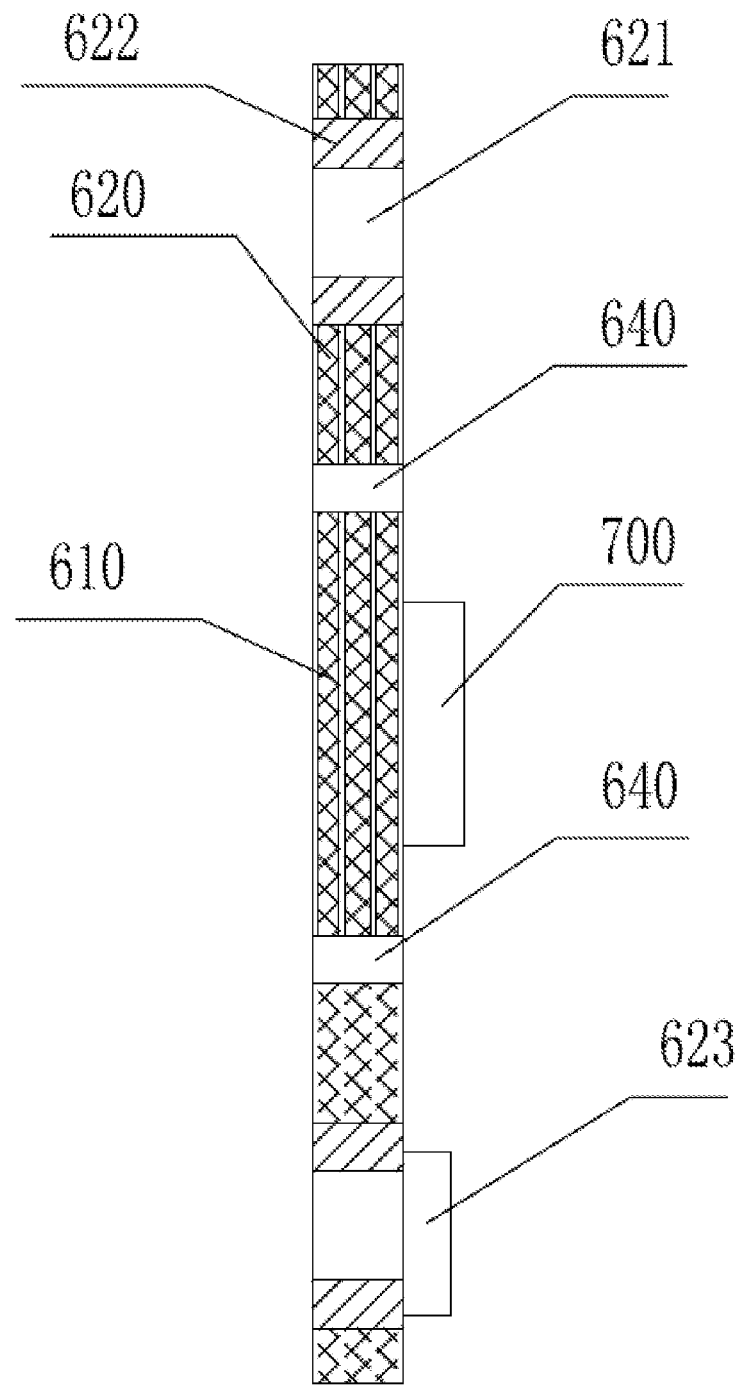
FIG. 2 is a schematic enlarged cross-sectional view along an A-A direction of the embodiment shown in FIG. 1.

For example, as shown in FIG. 1 and FIG. 2, an inertial measurement apparatus 60 includes a PCB board 600. The PCB board 600 includes an isolation portion 610 and a PCB body portion 620. The PCB board of the inertial measurement apparatus is provided with a connection seat 611. A pair of installation seats 621 are symmetrically disposed on two sides of the connection seat of the PCB board. The PCB board is provided with an isolation area 622 around the periphery of each installation seat. A spacing slot 640 is formed between each installation seat and the connection seat of the PCB board. The isolation portion and the PCB body portion are connected by a connecting piece 630 and separated by two spacing slots 640. For ease of understanding, in FIG. 2, a screw 623 is installed on an installation seat 621 and an IMU 700 is installed on the connection seat 611. For example, the IMU is a gyroscope and/or accelerometer IC. For example, other installation seats, namely, one or more further pairs of installation seats, are also symmetrically disposed on two sides of the connection seat of the PCB board. It may be understood that, one or more pairs of installation seats are symmetrically disposed on two sides of the connection seat of the PCB board. For example, a spacing slot is formed between a pair of installation seats closest to the connection seat and the connection seat. For another example, a spacing slot is formed between the connection seat and each installation seat. For another example, when there is a plurality of connection seats, using all the connection seats as a whole connection seat, a spacing slot is formed between a pair of installation seats closest to the whole connection seat and the whole connection seat, or a spacing slot is formed between the whole connection seat and each installation seat; and so on. As shown in FIG. 2, two pairs of installation seats are symmetrically disposed on two sides of the connection seat of the PCB board.

In an embodiment, the PCB board is a circuit board. In an embodiment, the PCB board is a printed circuit board. In an embodiment, the PCB board is a printed circuit board, and the isolation area is a remaining position after a conductive area of the PCB is removed. In this way, noise of IMUs such as a gyroscope and an accelerometer can be reduced by about 60%. In an example, the isolation area is a remaining position after copper foil of the PCB is removed. For example, the isolation area includes a remaining position after copper foil of the PCB is removed and space formed after the copper foil of the PCB is removed, the depth of the isolation area being the depth of the space formed after the copper foil of the PCB is removed. For example, the thickness of the remaining position after the copper foil of the PCB is removed is only two layers of copper foil different from the PCB thickness around. That is, the depth of the isolation area is the thickness of two layers of copper foil, about 70 microns. For another example, the depth of the isolation area is 5% to 20% of the depth of the PCB board. For example, the depth of the isolation area is 5% or 10% of the depth of the PCB board.

In an embodiment, the installation seat is provided with an installation structure. In an embodiment, the installation structure includes a screw. For example, the screw is screwed to the installation seat. For another example, the installation structure includes a screw and a nut, the screw passing through the installation seat and being fixed with the nut. For another example, the installation structure includes a fastener or a connector for fastening or connecting to the installation seat. It may be understood that the installation structure on the installation seat or another structure fixed on the installation seat is a major mechanical stress source, which causes problems that performance parameters of the inertial measurement apparatus are deteriorated or even damaged by mechanical stress. The deterioration of the performance parameters mainly includes a noise increase and a zero offset increase. These problems will reduce output precision of the gyroscope and the accelerometer, resulting in problems in a mechanical device adopting the inertial measurement apparatus, for example, reducing control accuracy of a gimbal and degrading stability augmentation of the gimbal.

For example, a spacing slot is formed and copper foil around a screw hole is removed to block and absorb mechanical stress, so that impact caused by the mechanical stress to the IMU is minimized, improving the IMU performance. The manner and position of the spacing slot can be flexibly adjusted depending on the position of the stress source. Mechanical stress is generated because the PCB board is fixed by locking screws. Embodiments of the present invention are also applicable to other board fixing manners provided that mechanical stress is caused to the board. In the embodiments of the inertial measurement apparatus of the present invention, noise of the IMU can be reduced by about 60% by adopting single spacing slot or isolation area design, while in an embodiment of spacing slot plus isolation area design, noise of the IMU caused by mechanical stress can be reduced by more than 90%, which greatly improves output precision of the IMU. In combination with a control algorithm, control precision of a mechanical device adopting the inertial measurement apparatus finally can reach 0.01.

For example, the spacing slot is a slot area formed by removing only copper foil on the PCB board or a slot area formed by cutting a part of the PCB board. The two slot area forming manners both can achieve a stress reduction effect, but the stress reduction effect of the slot area formed by removing only copper foil on the PCB board is worse than that of the slot area formed by cutting a part of the PCB board. In an embodiment, the two spacing slots are symmetrically formed. For example, the two spacing slots are axially symmetrically disposed. Positions and shapes of the spacing slots are related to a PCB area occupied by an IMU circuit and a stress point of the PCB. For example, the spacing slots need to be more than 1 millimeter (mm) away from the IMU circuit. In an example, two spacing slots, namely, spacing slot positions on two sides of the connection seat, are an axially symmetric structure, for example, symmetric relative to the IMU circuit, so that stress of the IMU is balanced on two sides. If the structure is asymmetric, external force on the IMU is unbalanced, which deteriorates performance parameters such as noise and zero offset of the gyroscope and the accelerometer, and reduces output precision. For example, the spacing slots are L-shaped, two L-shaped spacing slots are symmetrically disposed, and the connection seat is between the two L-shaped spacing slots. For another example, the spacing slots are rectangular, and two rectangular spacing slots are symmetrically disposed, and the connection seat is between the two rectangular spacing slots. In other words, the position of the connection seat is limited. For example, the width of the spacing slot is greater than 1 mm. In an example, the width of the spacing slot is proportional to the width of the connection seat, the width of the connection seat being the length of the connection seat between the two spacing slots perpendicular to a direction of the symmetry axis of the two spacing slots, which may be measured in microns or millimeters. When the width of the connecting seat is larger, the width of the spacing slot is larger. The width of the spacing slot is at least greater than 1 mm. The width of the spacing slot is mainly related to a PCB manufacturing process. A 1-mm-wide slot is a conventional process in board factories, which helps reduce board manufacturing costs. The specific width can be flexibly adjusted based on a PCB size and a process capability of a PCB board factory. The difference in the width of the spacing slot causes little impact to the stress reduction effect. Usually, only circuit layout, physical strength and manufacturing process need to be considered. The width of the spacing slot can be flexibly adjusted based on the size of board space and a process capability of a PCB board factory. Under the premise of satisfying a strength requirement, stress isolation effects of different spacing slot widths are basically the same.

In an embodiment, the distance between the spacing slot and the connection seat is greater than 1 mm. In this way, there is a certain distance between the spacing slot and the IMU, for example, a gyroscope and an accelerometer, connected to the connection seat, so that wiring space for the IMU circuit and manufacturability of a PCBA process are ensured. For example, the distance between the spacing slot and the connection seat is 1.2, 1.5, 2, 3, 4 or 5 mm. For example, the width of the spacing slot, the distance between the spacing slot and the connection seat, and the width of the connection seat are set separately. In another example, the distance between the spacing slot and the connection seat is proportional to the width of the connection seat. As described above, the width of the connection seat is the length of the connection seat between the two spacing slots perpendicular to a direction of the symmetry axis of the two spacing slots. When the width of the connecting seat is larger, the distance between the spacing slot and the connection seat is larger. The distance between the spacing slot and the connection seat is at least greater than 1 mm.

In an embodiment, the PCB board is provided with an isolation area around the periphery of each installation seat, the isolation area being disposed around the installation seat. In this way, copper foil around a screw hole is isolated from other electrical copper foil in the PCB board, so that a copper-foil-free isolation strip is formed between the copper foil around the screw hole and the copper foil in the PCB board. For example, the installation seat is in the shape of a circle or a regular polygon, and the isolation area is in the shape of a circular ring or a regular polygonal ring. For example, the installation seat is in the shape of a circle, and the isolation area is in the shape of a corresponding circular ring. For another example, the installation seat is in the shape of a regular polygon, and the isolation area is in the shape of a corresponding regular polygonal ring. In an example, the width of the isolation area is more than 30% of the diameter of the installation seat. An upper limit of the width of the isolation area is not limited, and can be flexibly set based on available space of the board. For example, the width of the isolation area is 50% to 200% of the diameter of the installation seat. The width of the isolation area can be freely set based on the space of the board. For example, the width of the isolation area is related to the space of the board. If the space of the board is large, the isolation area can be made wider. In an example, the width of the isolation area is 200% of the diameter of the installation seat. When the width of the isolation area is twice greater than the diameter of the installation seat, a further increase in the width of the isolation area barely contributes to the stress reduction effect. For example, if the isolation area is in the shape of a circular ring, the width of the isolation area is a difference between the radius of an outer circle and the radius of an inner circle of the circular ring, and so on. For example, the width of the isolation area is 60% to 120% of the diameter of the installation seat. For example, the isolation area is vacant or is filled with a colloid. For example, the colloid is a rubber gasket or a liquid-colloid-cured structure.

In an embodiment, the spacing slot includes a continuous spacing slot and/or a discontinuous spacing slot. The continuous spacing slot is continuous. For example, the continuous spacing slot is rectangular or L-shaped. The discontinuous spacing slot is discontinuous, including a plurality of discontinuous slot areas that are disconnected from each other. For example, the discontinuous slot areas are circular, triangular, rectangular or a combination thereof. For example, the width of the discontinuous spacing slot is the same as or different from the width of the continuous spacing slot. In an example, the spacing slot includes a continuous spacing slot and a discontinuous spacing slot. For example, the discontinuous spacing slot is located between the continuous spacing slot and the connection seat. For another example, the width of the discontinuous spacing slot is 1.2 to 1.5 times the width of the continuous spacing slot. For example, the width of the discontinuous spacing slot is 1.28 times the width of the continuous spacing slot, so that the stress isolation effect can be excellently improved. In an example, the spacing slot includes a continuous spacing slot and a discontinuous spacing slot, the discontinuous spacing slot being located between the continuous spacing slot and the connection seat, and the width of the discontinuous spacing slot being 1.2 to 1.5 times the width of the continuous spacing slot.

In an embodiment, the discontinuous spacing slot includes a single-layer discontinuous spacing slot and/or a multi-layer discontinuous spacing slot. For example, the single-layer discontinuous spacing slot is one layer of discontinuous spacing slot structure, and the multi-layer discontinuous spacing slot includes at least two layers of discontinuous spacing slot structures. In an embodiment, one layer of discontinuous spacing slot structure includes several discontinuous slot areas. In an embodiment, the discontinuous slot areas are circular, triangular, rectangular or a combination thereof. For example, the discontinuous slot areas include several circles like an ellipsis shape. In an embodiment, in the multi-layer discontinuous spacing slot, all the layers of discontinuous spacing slot structures are aligned or staggered. For example, all the layers of discontinuous spacing slot structures are aligned so that discontinuous slot areas of each layer of discontinuous spacing slot structure are aligned with, that is, completely overlap, discontinuous slot areas of adjacent layers. For example, all the layers of discontinuous spacing slot structures are staggered so that discontinuous slot areas of each layer of discontinuous spacing slot structure are staggered from or partially overlap discontinuous slot areas of adjacent layers, thereby achieving a good stress isolation effect.

In an embodiment, the PCB board includes an isolation portion and a PCB body portion, the connection seat being disposed on the isolation portion, and the isolation portion and the PCB body portion being connected by a connecting piece and separated by two spacing slots. In an embodiment, the width of the connecting piece is 5% to 80% of the width of the connection seat. For example, the width of the connecting piece is 8% to 40% of the width of the connection seat. For example, the width of the connecting piece is 15% or 38% of the width of the connection seat. A narrow width of the connecting piece helps isolate stress, but if the width is excessively narrow, the strength of a physical connection between the isolation portion and the PCB body portion is affected. Therefore, the width of the connecting piece needs to be properly designed. In an example, the width of the connecting piece is proportional to the length of the spacing slot, so that the isolation portion can maintain good rigidity in a vibrating environment.

In an embodiment, the PCB board is a rigid circuit board and/or a flexible circuit board (FPC). For example, when the PCB board is a rigid circuit board, the isolation portion, the connecting piece and the PCB body portion are integrally disposed. For example, the connecting piece is an integrally continuous structure or has at least one layer of discontinuous spacing slot structure, the integrally continuous structure being a rectangular continuous structure, a curved continuous structure or a wave-shaped continuous structure. For another example, when the PCB board is an FPC, the isolation portion and the PCB body portion are each provided with a reinforcing structure, and at least one connecting bridge is disposed between the isolation portion and the PCB body portion, the isolation portion and the PCB body portion being fixed with each other by the connecting bridge. For example, the reinforcing structure of the isolation portion and the reinforcing structure of the PCB body portion are fixed with each other by the connecting bridge. The connecting piece is used to ensure that the PCB board of the inertial measurement apparatus is not easily deformed. For example, the reinforcing structure includes the reinforcing structure of the isolation portion and the reinforcing structure of the PCB body portion, and the reinforcing structure and/or the connecting bridge are/is disposed on the back of the FPC. For example, the reinforcing structure and/or the connecting bridge and/is a steel sheet or an FR4 board. In an embodiment, the connecting bridge is perpendicular or inclined to the isolation portion. For example, when there are two connecting bridges, the two connecting bridges are symmetrically disposed. For example, the two connecting bridges are generally in the shape of "||" or "/\". The FPC and the connecting bridge are designed so that the isolation portion and the PCB body portion can be separately manufactured and then assembled for use, and the FPC is as rigid as a rigid circuit board. As circuit connection is implemented by using the FPC and the isolation portion and the PCB body portion are fixed with each other by the connection bridge, it further helps cut off and weaken energy transfer of mechanical stress, thereby reducing adverse effects of the mechanical stress on IMUs such as a gyroscope and an accelerometer.

In another embodiment of the present invention, optimization and advantages of the present invention and embodiments of the present invention are further explained by using an example in which the PCB board is a rigid printed circuit board and IMUs are a gyroscope and an accelerometer. First, a spacing slot is formed in a circuit area where gyroscope and accelerometer chips are located to implement isolation from a PCB area where a stress source is generated, and a single point connection is implemented in an area where the PCB is less stressed. It can be understood that the "single point" is not a point in the mathematical sense, and can be understood as a connecting piece as described above. The shape or width of the single point is related to the length of the spacing slot. For example, if the spacing slot is long, to enable the PCB in the area where the IMUs are located to maintain good rigidity in a vibrating environment, the single point connection is required to be wider. For example, if the spacing slot is short, the single point connection can be narrow. Secondly, copper foil around the connection installation seat, for example, a screw hole, is isolated from other electrical copper foil in the PCB board, so that the screw hole becomes isolated. The reason for such design is that a PCB material with copper foil is more rigid than a PCB material without copper foil. When the copper foil is removed, the isolation area is less rigid, and can absorb a part of mechanical stress and reduce mechanical stress transferred to the inside of the board. Such design can achieve the effect of absorbing at least 50% of the stress.

Output precision, noise, and zero offset of the gyroscope and the accelerometer directly affect attitude accuracy, affecting accuracy of a gimbal IMU algorithm and control precision of a gimbal. Therefore, good IMU performance is critical to stability augmentation control of the gimbal. There are many factors affecting the IMU performance. In the inertial measurement apparatus of the present invention, impact of external stress to the gyroscope and the accelerometer is reduced only from the perspective of mechanical stress by properly optimizing the PCB design of the IMU board, to improve the IMU performance, thereby reducing noise of the inertial measurement apparatus, and improving control precision of a related mechanical device such as a gimbal.

Further description is provided below by using an example in which the installation structure is a screw. Since the IMU board is screwed to a housing where a lens module is located, the PCB board is subjected to stress caused by screw locking, the PCB design is optimized in two aspects. A spacing slot is formed in the circuit area where the gyroscope and accelerometer chips are located to implement isolation from the PCB area where the stress source is generated. A single point connection is implemented in the area where the PCB is less stressed. The copper foil around the connection screw hole is isolated from other electrical copper foil in the PCB board, so that the screw hole becomes isolated. The reason for such design is that a PCB material with copper foil is more rigid than a PCB material without copper foil. When the copper foil is removed, the isolation area is less rigid, and can absorb a part of mechanical stress and reduce mechanical stress transferred to the inside of the board.

In the inertial measurement apparatus according to the embodiments of the present invention, a process of blocking and weakening mechanical stress is as follows: when the screw is locked and the installation structure and the apparatus above are vibrated, the stress is transferred to the inside of the board. The rigidity of the PCB board is weakened in the isolation area, and a part of stress is absorbed. Then the remaining stress continues to be transferred to the inside of the board. When the stress is transferred to the spacing slot, the stress is cut off here. In this way, the stress that can be transferred to the gyroscope and accelerometer circuit part can pass through only the narrow connecting piece between the isolation portion and the PCB body portion. Moreover, because the connecting piece is at the symmetry point of upper and lower installation seats (screw holes) and is far from the screw holes, the stress that can be transferred to the gyroscope and accelerometer circuit part is almost negligible. It is proved by experiments that when the same force is used to lock the screw for the IMU board, noise of the gyroscope and the accelerometer in the inertial measuring apparatus of the present invention is about 60% lower than that in an unoptimized one, thereby greatly improving output precision of the gyroscope and the accelerometer. In combination with a control algorithm, control precision of a gimbal finally can reach 0.01. The control precision is the highest level of stability augmentation control precision of current camera gimbals. The zero offset can be reduced by about 30%.

A mechanical device includes the inertial measurement apparatus according to any of the embodiments. In an embodiment, the mechanical device is a gimbal, a robot, an unmanned aerial vehicle or a manned aircraft. For example, a gimbal includes the inertial measurement apparatus according to any of the embodiments, and so on. In the mechanical device, PCB board design of the inertial measurement apparatus is optimized, so that mechanical stress transferred to the inertial measurement apparatus is reduced or even eliminated, and IMUs such as a gyroscope and an accelerometer in the inertial measurement apparatus are less affected by the mechanical stress, which reduces noise and zero offset, helps achieve optimal performance of the gyroscope and the accelerometer, and improves control precision of the inertial measurement apparatus.

Figure 3:
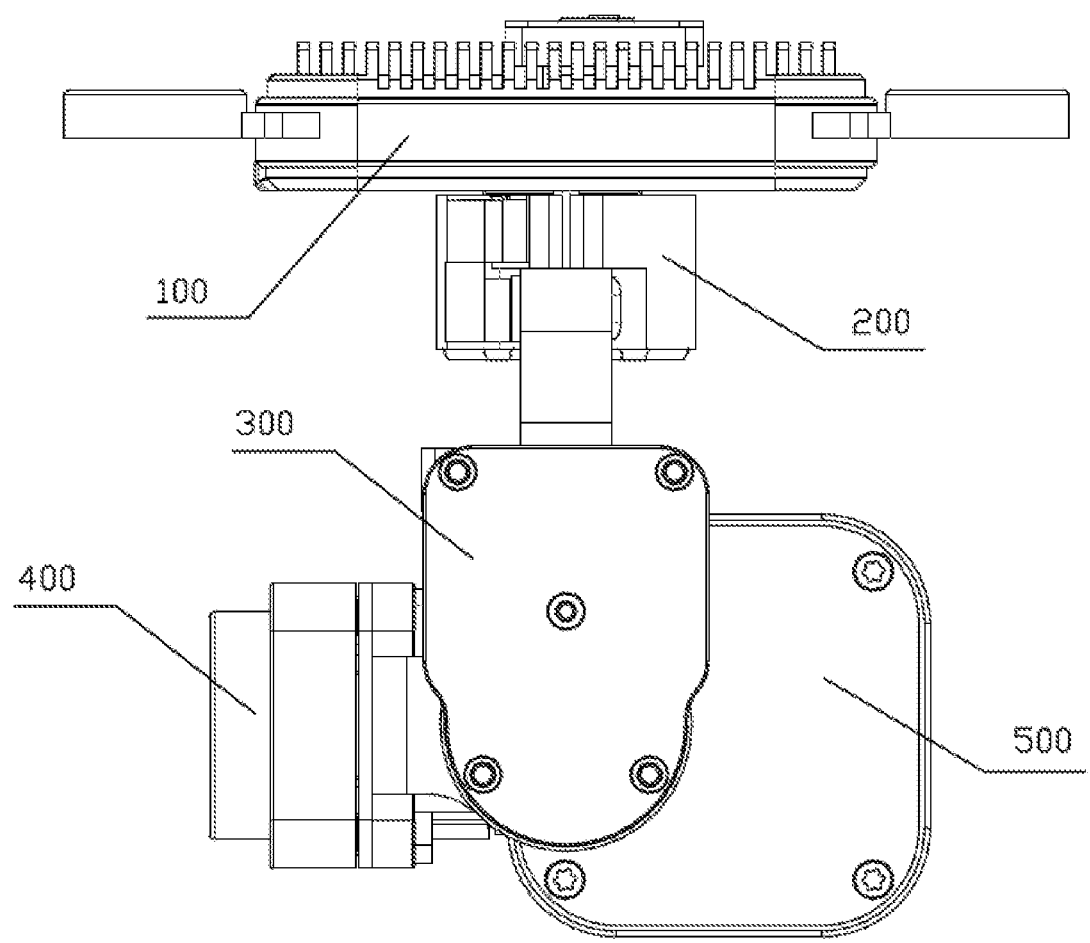
FIG. 3 is a schematic structural diagram of a gimbal according to an embodiment of the present invention.
Figure 4:
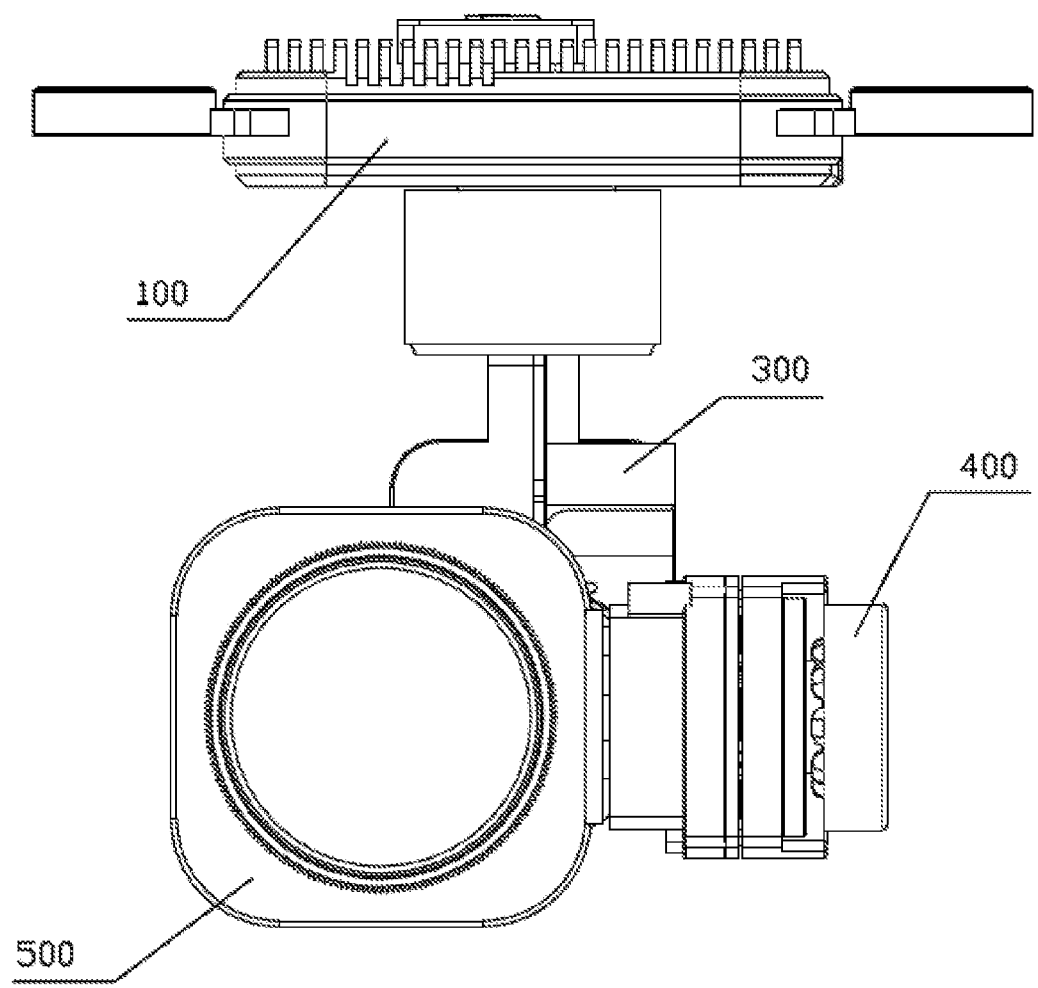
FIG. 4 is a schematic diagram of the embodiment shown in FIG. 3 in another direction.
Figure 5:
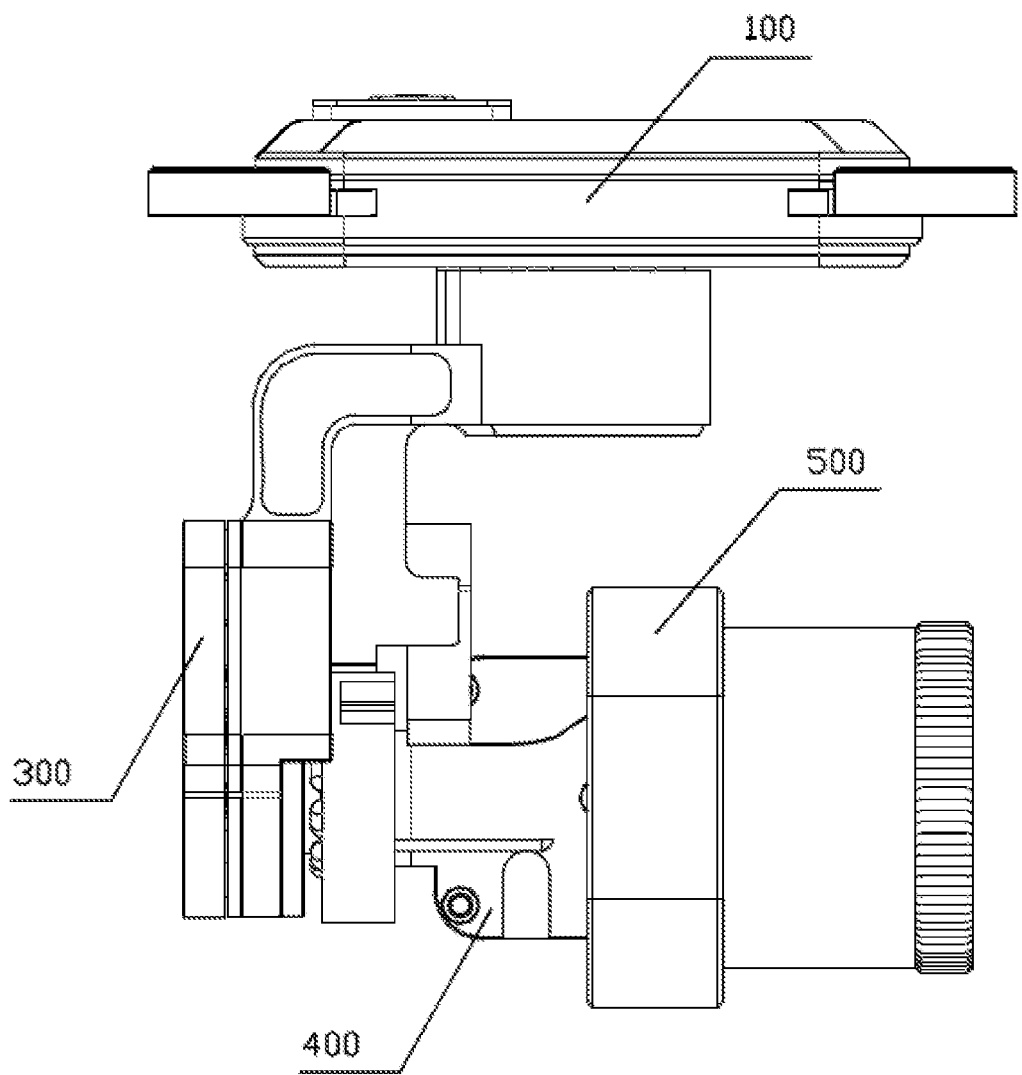
FIG. 5 is a schematic diagram of the embodiment shown in FIG. 3 in still another direction.
Figure 6:
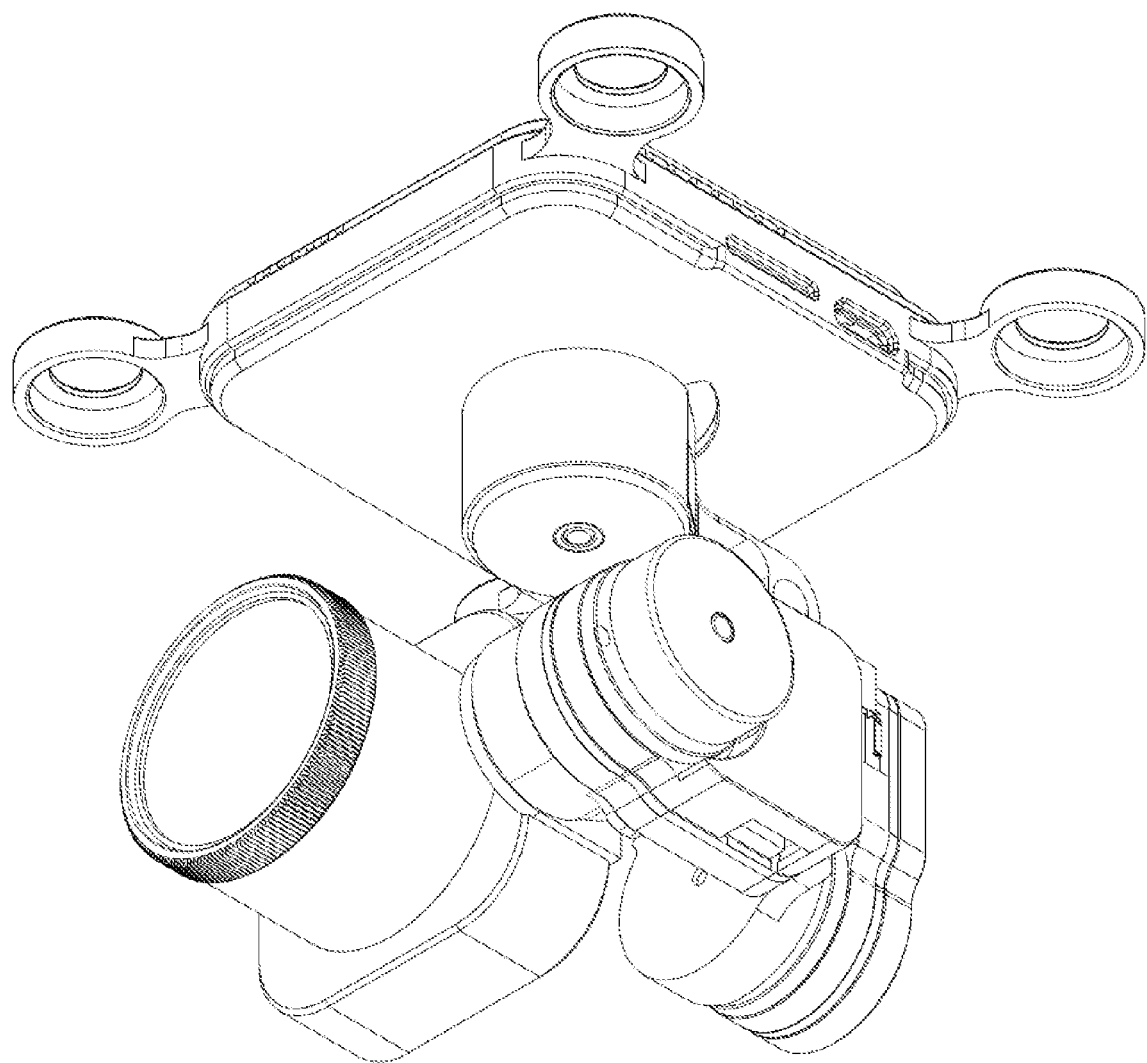
FIG. 6 is a schematic diagram of a three-dimensional structure of the embodiment shown in FIG. 3.

For example, for the gimbal, by optimizing the PCB design of the IMU board, the PCB structure design is optimized from the perspective of the stress of the entire PCB, so that mechanical stress transferred to the gyroscope and the accelerometer is reduced or eliminated, and adverse effects of the mechanical stress on the gyroscope and the accelerometer are reduced or eliminated, thereby achieving optimal performance of the gyroscope and the accelerometer, and improving control precision of the gimbal. For example, schematic diagrams of a gimbal according to an embodiment in different directions are respectively shown in FIG. 3, FIG. 4 and FIG. 5, which includes a camera motherboard 100, a yaw axis 200 (for determining a yaw angle), a roll axis 300 (for determining a roll angle), a pitch axis 400 (for determining a pitch angle), an IMU board and a lens module 500 that is fixed on the IMU board. A three-dimensional structure of the gimbal is shown in FIG. 6.

The application of the gimbal IMU is used as an example above. It can be understood that the stress-resistant design of the PCB board (or referred to as the board) can be applied to the gimbal IMU, and can also be applied to other devices that require an IMU, such as robots, unmanned aerial vehicles and manned aircrafts, to reduce or avoid impact of mechanical stress to gyroscopes and accelerometers.

It should be noted that, other embodiments of the present invention further include an inertial measurement apparatus and a mechanical device that can be implemented by combining the technical features in the foregoing embodiments. In traditional IMU board design, the PCB is generally designed based only on wiring guidance of a gyroscope or an accelerometer. For example, pins are symmetrically wired, a device does not have other elements placed around at a specific distance, or the device center is not perforated or wired. Although these design solutions design the PCB from the perspective of stress, only stress balance of an MEMS chip is considered, rather than stress of the entire PCB, which cannot withstand large external unbalanced mechanical stress. In the present invention and embodiments of the present invention, the PCB board design is optimized so that energy transfer of mechanical stress is cut off and weakened, which minimizes adverse effects of the mechanical stress on the gyroscope and the accelerometer, greatly improves accuracy of IMU attitude detection, and helps improve control precision to the highest level based on the prior art.

The technical features of the embodiments may be combined arbitrarily. For brief description, possible combinations of the technical features in the embodiments are not all described. However, all combinations of these technical features should be considered as falling within the scope described in this specification, as long as there is no contradiction in the combinations.

The foregoing embodiments are merely some embodiments of the present invention, which are specifically described in detail. However, it should not be construed as a limitation to the patent scope of the present invention. It should be noted that persons of ordinary skill in the art may further make some variations and improvements without departing from the concept of the present invention, and the variations and improvements all belong to the protection scope of the present invention. Therefore, the patent protection scope of the present disclosure shall be subject to the appended claims.

What is claimed is:

1. An inertial measurement apparatus, comprising a PCB and an inertial measurement unit (IMU), the PCB comprising a PCB body portion and an isolation portion that is formed by grooving on a single edge of the PBC, then continuing inward towards the center of the PCB, the isolation, portion is a symmetric structure and is symmetrically disposed relative to a symmetry axis of the PCB body portion, wherein the isolation portion is fixedly connected to the PCB body portion, wherein the IMU is disposed on the isolation portion.

2. The inertial measurement apparatus according to claim 1, wherein the PCB body portion is integrally connected to the isolation portion.

3. The inertial measurement apparatus according to claim 1, wherein the isolation portion is provided with a connection seat, the IMU being fixedly connected to the connection seat.

4. The inertial measurement apparatus according to claim 3, wherein the PCB body portion is symmetrically provided with a pair of installation seats on two sides of the connection seat.

5. The inertial measurement apparatus according to claim 4, wherein the slotting is forming a spacing slot, which is formed between each installation seat and the connection seat on the PCB.

6. The inertial measurement apparatus according to claim 5, wherein the spacing slot comprises a continuous spacing slot and/or a discontinuous spacing slot.

7. The inertial measurement apparatus according to claim 6, wherein the continuous spacing slot is L-shaped or rectangular.

8. The inertial measurement apparatus according to claim 5, wherein the two spacing slots are symmetrically formed.

9. The inertial measurement apparatus according to claim 5, wherein the spacing slot is a slot area formed by removing copper foil on the PCB or a slot area formed by cutting a part of the PCB.

10. The inertial measurement apparatus according to claim 5, wherein there is a plurality of IMUs, the PCB being correspondingly provided with a plurality of connection seats, and the spacing slot being formed between any two adjacent connection seats.

11. The inertial measurement apparatus according to claim 4, wherein the PCB body portion is provided with an isolation area around each installation seat.

12. The inertial measurement apparatus according to claim 11, wherein the isolation area is ring-shaped.

13. The inertial measurement apparatus according to claim 11, wherein the isolation area is a remaining position after conductive copper foil of the PCB is removed.

14. The inertial measurement apparatus according to claim 1, wherein the IMU comprises a gyroscope and/or an accelerometer.

15. A mechanical device, comprising an inertial measurement apparatus, wherein the inertial measurement apparatus comprising a PCB and an inertial measurement unit (IMU), the PCB comprising a PCB body portion and an isolation portion that is formed by grooving on a single edge of the PCB, then continuing inward towards the center of the PCB, the isolation portion is a symmetric structure and is symmetrically disposed relative to a symmetry axis of the PCB body portion, wherein the isolation portion is fixedly connected to the PCB body portion, wherein the IMU being disposed on the isolation portion.

16. The mechanical device according to claim 15, wherein the mechanical device is a gimbal, a robot, an unmanned aerial vehicle or a manned aircraft.

* * * * *